(12) United States Patent
Kim et al.

(10) Patent No.: US 8,394,878 B2
(45) Date of Patent: Mar. 12, 2013

(54) HYPERBRANCHED ORGANIC MODIFIER, METHOD OF PREPARING THEREOF AND ORGANO-MODIFIED CLAY USING THE SAME

(75) Inventors: Il Jin Kim, Gunpo-si (KR); Kee Hae Kwon, Gunpo-si (KR); Hyung Rang Moon, Seoul (KR); Jae Bum Park, Incheonwangyeok-si (KR); Seong Ho Kong, Seoul (KR)

(73) Assignee: Cheil Industries Inc., Gumi-si (KR)

( * ) Notice: Subject to any disclaimer, the term of this patent is extended or adjusted under 35 U.S.C. 154(b) by 500 days.

(21) Appl. No.: 12/665,077

(22) PCT Filed: Dec. 31, 2007

(86) PCT No.: PCT/KR2007/007006
§ 371 (c)(1),
(2), (4) Date: Dec. 17, 2009

(87) PCT Pub. No.: WO2009/005190
PCT Pub. Date: Jan. 8, 2009

(65) Prior Publication Data
US 2010/0190905 A1    Jul. 29, 2010

(30) Foreign Application Priority Data
Jul. 2, 2007    (KR) .................. 10-2007-0066039

(51) Int. Cl.
*C08K 5/05*    (2006.01)
*C09D 5/18*    (2006.01)

(52) U.S. Cl. ......... 524/387; 568/852; 528/271; 428/339
(58) Field of Classification Search ................... 524/387; 528/271; 428/339; 568/852
See application file for complete search history.

(56) References Cited

U.S. PATENT DOCUMENTS

| 4,810,734 A | 3/1989 | Kawasumi et al. |
| 4,889,885 A | 12/1989 | Usuki et al. |
| 6,770,696 B1 | 8/2004 | Ko et al. |

FOREIGN PATENT DOCUMENTS

| KR | 2004-0099572 A | | 12/2004 |
| KR | 2005-0112693 A | | 12/2005 |
| KR | 2005/042880 | * | 5/2006 |
| WO | 20091005190 A1 | | 1/2009 |

OTHER PUBLICATIONS

International Search Report of Counterpart International Application Serial No. PCT/KR20071007006, dated Apr. 4, 2008.

* cited by examiner

*Primary Examiner* — James J Seidleck
*Assistant Examiner* — Deve E Valdez
(74) *Attorney, Agent, or Firm* — Summa, Additon & Ashe, P.A.

(57) ABSTRACT

The present invention provides a method of preparing a hyperbranched organic modifier which comprises reacting (a) a tertiary amine compound having at least two terminal hydroxyl groups with (b) at least one multifunctional monomer having at least two terminal functional groups capable of reacting with said hydroxyl groups. The present invention also provides an organo-modified clay treated with the hyperbranched organic modifier.

8 Claims, No Drawings

HYPERBRANCHED ORGANIC MODIFIER, METHOD OF PREPARING THEREOF AND ORGANO-MODIFIED CLAY USING THE SAME

TECHNICAL FIELD

The present invention relates to a method of preparing an organic modifier used in preparing a polymer-clay nanocomposite. More particularly, the present invention relates to a method of preparing a hyperbranched polymer organic modifier which is stably dispersed in water and polar organic solvent. The present invention provides a polymer-clay nanocomposite prepared by using the organic modifier.

BACKGROUND ART

Clay used in preparing polymer-clay nanocomposites has a layered-structure in which silicate plates are layered on a nanoscale by van der Waals' force. A polymer-clay nanocomposite makes the layered silicate structure exfoliated. This allows silicate to disperse uniformly on a nanoscale in polymer resins, so that the polymer resin can have better mechanical properties than conventional polymer resins and can achieve new properties such as gas shielding and thermal resistance that are not seen in conventional resins.

However, the clay used in a nanocomposite is itself hydrophilic and it is mainly acquired by treating natural montmorillonite with a metal cation. Further, there are difficulties in exfoliation and dispersion of the layered-structure into hydrophobic polymer resins because strong van der Waals' force acts between layers of silicate plates.

In order to solve those problems, U.S. Pat. Nos. 4,889,885 and 4,810,734 disclose a method of preparing an organic modified clay, in which a layered clay is subjected to ion exchange with an organic cation having a low molecular weight and whose structure has an affinity with polymer resin to expand the interlayer distance of the clay.

Because an organo-modified clay has micron sized particles, it is necessary to use a material which is capable of interaction between a polymer matrix and clay to disperse the clay on a nanoscale basis. In general, the clays may obtain compatibility with a polymer resin by conversion of the clays to ammonium or phosphonium form. However, conventional nanoclays in ammonium form have low thermal stability and are susceptible to decomposition during molding processes at around 200° C. or more, which results in poor elongation and toughness as well as discoloration in the nanocomposite. Therefore, conventional nanoclays in ammonium form have limits in application. On the other hand, nanoclays in phosphonium form have better thermal stability than nanoclays in ammonium form, but have low compatibility with polymer resins. Thus, nanoclays in phosphonium form show low improvement of flexural modulus and weak elongation.

Furthermore, organo-modified clays employing conventional organic modifiers have some disadvantages that they cannot be dispersed either in water or in any polar organic solvent.

Accordingly, the present inventors have developed a method of surface treating clay for polymer-clay nanocomposites by organic treatment of the surface of clay with a novel hyperbranched polymer having a three-dimensional structure, so that the clay can have good dispersibility in polar organic solvent and improved thermal stability.

DISCLOSURE OF THE INVENTION

Technical Problem

An object of the present invention is to provide a method of preparing an organic modifier which can stably disperse clays either in water or polar solvent in the process of preparing a polymer-clay nanocomposite.

Another object of the present invention is to provide a method of preparing a polymer-clay nanocomposite in which clays are well dispersed by interaction between a polymer matrix and an organic modifier.

A further object of the present invention is to provide a polymer-clay nanocomposite having good thermal stability and good mechanical properties by using the surface-treated clay.

Other objects and advantages of this invention will be apparent from the ensuing disclosure and appended claims.

Technical Solution

One aspect of the invention provides a method of preparing a hyperbranched organic modifier. The method comprises a step of reacting (a) a tertiary amine compound having at least two terminal hydroxyl groups with (b) at least one multifunctional monomer having at least two terminal functional groups capable of reacting with the hydroxyl groups.

Another aspect of the present invention provides a hyperbranched organic modifier prepared by the foregoing method.

In an exemplary embodiment of the invention, the hyperbranched organic modifier has a number average molecular weight of about 200 to about 30,000, about 5 to about 300 hydroxyl groups per polymer chain and about 0 to about 100 carbonyl groups of per polymer chain.

A further aspect of the present invention provides an organo-modified clay treated with the foregoing hyperbranched organic modifier. The organo-modified clay has an interlayer distance of from about 3 nm to about 20 nm.

In an exemplary embodiment of the invention, the organo-modified clay is treated by adding the hyperbranched organic modifier to water-dispersed layered silicates to perform an ion exchange reaction.

The layered silicate is at least one selected from the group consisting of montmorillonite, hectorite, saponite, laponite, beidellite, bentonite, nontronite, vermiculite, illite, muscovite, pyrophillite and mica.

A further aspect of the present invention provides a nanocomposite resin employing the foregoing organo-modified clay. The nanocomposite resin comprises about 100 parts by weight of a base resin and about 0.1~20 parts by weight of the organo-modified clay prepared by the above method. The base resin is one or more selected from the group consisting of high impact polystyrene resin, polyolefin resin, polyamide resin, acrylic resin, polyester resin and ABS resin.

BEST MODE FOR CARRYING OUT THE INVENTION

The organic modifier of the present invention may be prepared by reacting (a) a tertiary amine compound having at least two terminal hydroxyl groups with (b) at least one multifunctional monomer having at least two terminal functional groups capable of reacting with the hydroxyl groups.

The tertiary amine compound (a) is capable of substitution reaction with layered silicates and has at least two terminal hydroxyl groups.

The tertiary amine compound (a) of the present invention is represented by the following Chemical Formula 1.

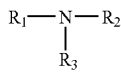

[Chemical Formula 1]

wherein $R_1$ is a $C_1$~$C_8$ aliphatic group having a terminal hydroxyl group or a terminal amine group; $R_2$ and $R_3$ are independently a $C_1$~$C_{18}$ aliphatic group having a terminal hydroxyl group; and the functionality of the tertiary amine is 2~3.

The multifunctional monomer (b) of the present invention has at least two terminal functional groups which can react with the hydroxyl groups of the compound represented by Chemical Formula 1 to conduct esterification. The multifunctional monomer (b) is represented by the following Chemical Formula 2.

[Chemical Formula 2]

wherein R is a $C_{1-20}$ aliphatic or aromatic group or a derivative thereof; A and B are selected from the group consisting of hydroxyl group, amine group, epoxy group, and carboxyl group; x is 1 or 2; y is an integer from 1 to 4; and the functionality of the multifunctional monomer is 2~6.

Examples of A and B may include A=carboxyl group and B=hydroxyl group, or A=epoxy group and B=hydroxyl group.

Examples of the multifunctional monomer (b) may include glycidol, dihydroxybenzoic acid, hydroxyisophthalic acid, bishydroxymethylpropionic acid, trishydroxyphenylethan, bisphenyl thiophenyl sulfoxide, bisaminophenoxy benzoic acid, bistrimethylsiloxy benzoyl chloride, hydroxyalkoxy isophthalate and the like.

The organic modifier can be prepared by a condensation reaction between the compound of Chemical Formula 1 and the compound of Chemical Formula 2, thereby obtaining a hyperbranched polymer. The hyperbranched polymer can be prepared by a conventional esterification reaction, and the reaction conditions can be varied according to the types of compounds of Chemical Formula 1 and 2.

In the esterification reaction, about 1 mol of a compound having Chemical Formula 1 and about 1 mol or more, preferably about 2 mol or more, of a compound having Chemical Formula 2 are stirred under a nitrogen atmosphere, while gradually raising the temperature. When water or alcohol is produced in the esterification process, the temperature is maintained until the reaction is completed to obtain a hyperbranched polymer having an ester group.

The hyperbranched polymer obtained from the above has a tertiary amine structure, therefore it can be easily changed to ammonium salt by HCl. Therefore, the hyperbranched polymer can be intercalated into the layered silicates due to the ammonium salt.

The hyperbranched organic modifier prepared by the above method may have a number average molecular weight of about 200 to about 30,000, about 5 to about 300 hydroxyl groups per polymer chain and about 0 to about 100 carbonyl groups per polymer chain.

Due to its highly branched structure, the organic modifier of the present invention may have lower chain entanglement and packing density than a linear polymer and may have relatively more space between the polymer chains. These characteristics may contribute to easy expansion of the interlayer distance of silicate, compared to other conventional organic modifiers.

A further aspect of the present invention provides an organo-modified clay which can be stably dispersed either in water or in polar organic solvent by employing the hyperbranched organic modifier.

In one embodiment, the organo-modified clay may be treated with the hyperbranched organic modifier and the interlayer distance thereof ranges from about 3 nm to about 20 nm.

The organo-modified clay can be treated by adding the hyperbranched organic modifier to water-dispersed layered silicates to perform a conventional ion exchange reaction.

The layered silicate in which polymer can be intercalated has a basic interlayer distance of about 9~13 nm, and a cation exchange capacity of about 50~300 meq/100 g, preferably about 90~130 meq/100 g. In addition, the layered silicate has an average particle size in the range of from about 0.1 μm to 50 μm, preferably about 25 μm or less, and more preferably about 10 μm or less.

Examples of the layered silicate which meet the conditions described above may include montmorillonite, hectorite, bentonite, saponite, laponite, beidellite, nontronite, vermiculite, illite, muscovite, pyrophillite, mica, and the like. Preferably sodium montmorillonite and sodium hectorite may be used. The layered silicates may be used alone or in combination with one another.

In one embodiment, organo-modified clay may be prepared by the following method.

A layered silicate is added to deionized water and then stirred to prepare a dispersion solution. In an exemplary embodiment of the invention, about 1~10 parts by weight, preferably about 1~5 parts by weight, of silicate is added into about 100 parts by weight of deionized water and the temperature is raised to about 90° C. or less, preferably about 50~85° C.

An aqueous solution of organic modifier of the present invention is subsequently added to the dispersion solution. In an exemplary embodiment of the invention, the aqueous solution of organic modifier is added in an amount of about 5~20 parts by weight per about 100 parts by weight of deionized water. The amount of HCl and the organic modifier may be controlled according to cation exchange capacity. When the aqueous solution of organic modifier is gradually added to the dispersion solution, the organic modifier in the aqueous solution of organic modifier intercalates into layered silicates, thereby significantly increasing the density. The resulting solution is subjected to several filterings and washings, followed by completely drying through vacuum drying or freeze-drying to prepare an organo-modified clay in powder form In the present invention, interlayer distance, hydrophilicity and oleophilicity of organo-modified clay can be variously controlled by the types of monomer (chemical formula 2) and molecular weight of the hyperbranched polymer.

In one embodiment, the hydrophilicity may be improved by employing a superbranched polyol having a small number of carbons and a large number of ether or ester groups. Examples of the superbranched polyol may include water-soluble polyglycerol having a hyperbranched structure, which can have average molecular weight selected from the range of about 500 to about 4,000.

In another embodiment, the oleophilicity may be improved by forming ester bonds or peptide bonds between functional groups (including alcohol groups, carboxyl groups or alkylester groups) of the hyperbranched polymer and by forming a compound having phenol group using a surface functionalization reaction of amines.

The organic modifier of the present invention may lead to the structure which is well dissolved in water and has high compatibility with polymer. In particular, the organic modifier has good irascibility with polar solvents such as N, N'-dimethylformamide (DMF) and N-methylpyrrolidone (NMP) and can effectively treat clay. Therefore, the organo-modified clay treated with the organic modifier may form a dispersed phase in polar solvent. Furthermore, since the organic modifier of the present invention has a reactive group (hydroxyl group or amine group) which improves interfacial adhesion strength between polymer and organo-modified clay by reacting with polymer, it provides good physical properties. At the same time, since the organic modifier has a highly branched structure, it has low chain entanglement and packing density as compared to a linear polymer. Therefore, it has relatively more space between the polymer chains. As a result, the organic modifier can easily enlarge the interlayer distance of clay by controlling the molecular weight of the organic modifier, and the polymer can be easily intercalated into the interlayers of the organo-modified clay.

The organo-modified clay of the present invention can be melt-blended with a resin such as high impact polystyrene resin (HIPS), polyester resin, polyolefin resin, polyamide resin, acrylic resin, rubber-modified aromatic vinyl-cyanide vinyl graft copolymer resin and the like to prepare a polymer-clay nanocomposite having good impact strength and thermal stability. The amount of the organo-modified clay may be preferably about 0.1 to about 20 parts by weight, more preferably about 1 to about 10 parts by weight, per about 100 parts by weight of the resin. Good impact strength and thermal stability can be obtained using such a range.

Further, when the organo-modified clay of the present invention is used to prepare a polymer-clay nanocomposite in an in-situ solution polymerization, it may improve polymerization stability and dispersibility.

Since the hyperbranched organic modifier of the present invention has many terminal functional groups which cause high interfacial adhesion strength between polymer and clay, it provides good physical properties. Moreover, the highly branched structure of the organic modifier of the present invention may lead to an increase in the interlayer distance of clay so that the polymer can be easily intercalated into the interlayers of the organo-modified clay to form a nanocomposite having an intercalated or exfoliated structure.

The invention may be better understood by reference to the following examples which are intended for the purpose of illustration and are not to be construed as in any way limiting the scope of the present invention, which is defined in the claims appended hereto.

Mode for the Invention

EXAMPLES

Example 1

Synthesis of Hyperbranched Polyglycerol Organic Modifier

As shown in Reaction Formula 1, 12 g of N-methyldiethanolamine was added to a 1,000 ml round-bottom flask. Then, 400 g of glycidol and 6 g of NaOCH$_3$ as a catalyst were dropwise added to the flask through a dropping funnel under stirring. The reaction was carried out at the temperature of 95° C. for 12 hours under a nitrogen atmosphere. After the reaction was completed, the resulting reaction product was dissolved in methanol and precipitated in acetone to obtain a transparent hyperbranched polyglycerol organic modifier in the form of a highly viscous fluid (yield: 78%).

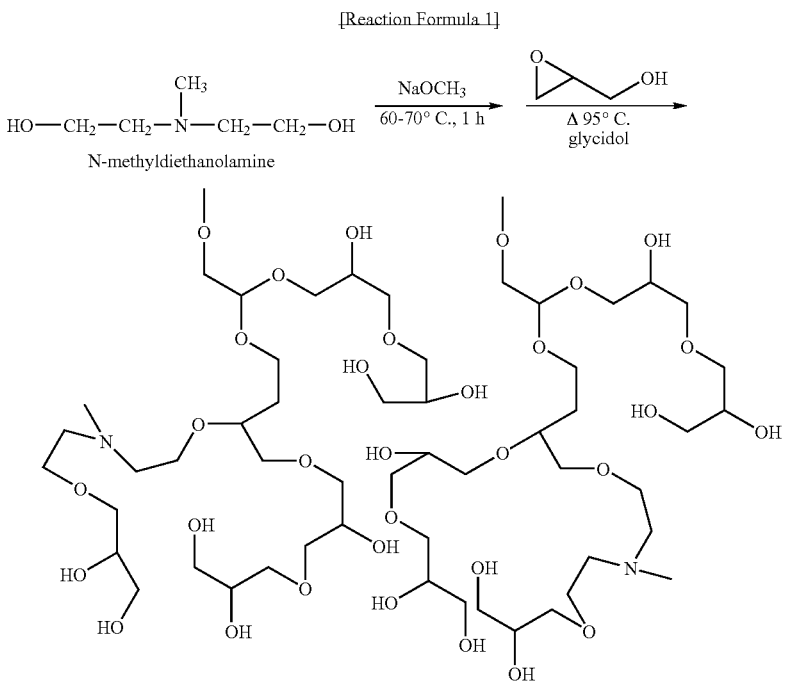

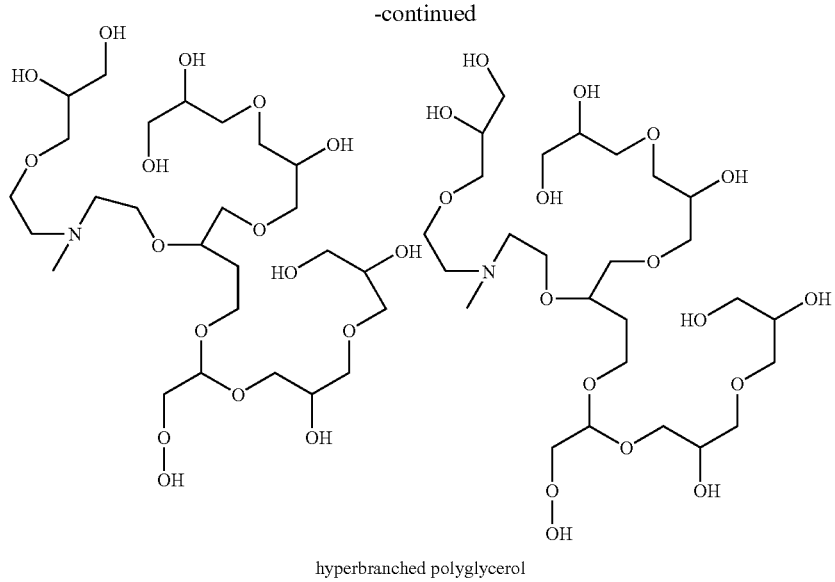

hyperbranched polyglycerol

Example 2

Synthesis of Hyperbranched Alyfatic Polyester Organic Modifier 300 g of 2,2-bis hydroxylmethyl propionic acid (BHMP) and 22.5 g of 2-ethyl-2-hydroxymethyl-1-3-propanediol were added to a 1000 ml round-bottom flask which contains 12 g of N-methyl diethanol amine in the presence of nitrogen under stirring. The reaction was carried out at the temperature of 140° C. for 2 hours under a nitrogen atmosphere, followed by removing byproducts of condensation polymerization through vacuum distillation (12 mbar, cooling trap) at room temperature for 1 hour. Then, 8.94 g of 2,2-bishydroxymethylpropionic acid was further added thereto, followed by a secondary hyperbranching polymerization at 140° C. for 2 hours. As above, byproducts of condensation polymerization were further removed by vacuum distillation to obtain a hyperbranched aliphatic polyester (yield: 68%).

Preparation of Organo-Modified Clay

Example 3

15 g of Na+montmorillonite (Cloisite Na+) was added into a 2,000 ml round-bottom flask and 1,000 ml of deionized water was poured into the flask. The mixture was vigorously stirred so that montmorillonite could be well dispersed in deionized water. The organic modifier obtained from Example 1 containing twice the cation exchange capacity of Na+montmorillonite was dissolved in water or in mixture of alcohol (ethanol, isopropilalcohol) and water, followed by adding 2.8 ml of hydrochloric acid to cationize the tertiary amine in the organic modifier. The organic modifier solution was poured into the dispersed clay suspension to prepare an organo-modified clay by a cation-exchange reaction. The reaction was carried out at the temperature of 65° C. for 24 hours. The resulting organo-treated montmorillonite was separated by centrifugation, washed with deionized water or with a mixture of alcohol and deionized water, and freeze-dried for two days. The freeze-dried organo-modified clay was pulverized to the size of 200 μM or less and then stored. The interlayer distance of organo-modified clay and the ion exchange rate are shown in Table 1.

Examples 4~8

Examples 4~8 were conducted in the same manner as in Example 3 except that the types of monomer and the molecular weight of organic modifier were changed as in Table 1.

Comparative Example 1

Na+montmorillonite which was not organo-treated was used and the interlayer distance was measured.

Comparative Example 2

Cloisite 10A manufactured from Southern Clay Product Inc. was used and the interlayer distance was measured.

Comparative Example 3

Cloisite 30B manufactured from Southern Clay Product Inc. was used and the interlayer distance was measured.

TABLE 1

| | | monomer types | clay types | molecular weight (Mn) of organic modifier | Interlayer distance (nm) | Ion exchange ratio (%) |
|---|---|---|---|---|---|---|
| Comp. | 1 | — | Na + montmorillonite | — | 1.17 | — |
| Example | 2 | — | Cloisite 10A | — | 1.92 | — |
| | 3 | — | Cloisite 30B | — | 1.85 | — |

TABLE 1-continued

| | | monomer types | clay types | molecular weight (Mn) of organic modifier | Interlayer distance (nm) | Ion exchange ratio (%) |
|---|---|---|---|---|---|---|
| Example | 3 | Glycidol | Na + montmorillonite | 500 | 3.02 | 58.4 |
| | 4 | Glycidol | Na + montmorillonite | 1000 | 4.98 | 53.2 |
| | 5 | Glycidol | Na + montmorillonite | 2000 | 7.12 | 34.1 |
| | 6 | BHMP | Na + montmorillonite | 600 | 4.34 | 51.8 |
| | 7 | BHMP | Na + montmorillonite | 1200 | 6.85 | 47.6 |
| | 8 | BHMP | Na + montmorillonite | 2400 | 9.78 | 32.9 |

The interlayer distance of the organo-modified clay in Table 1 above was measured by X-rays diffraction (XRD) and was examined using CuKα(λ=0.154 nm) beam. The ion exchange rate represented the degree of substitution by organic modifier through an ion exchange reaction and it was measured by thermogravimetric analysis (TGA).

Dispersion Stability of Organo-Modified Clay in Water 1.0 g of clay and 30 g of water were added to a 50 ml vial. The mixture of clay and water was treated with ultrasonic waves for 1 hour, placed at room temperature for 7 days, and then compared with the organo-modified clay of Comparative Examples 2 and 3 and the hyperbranched organo-modified clay of Examples 3 and 6 with regard to dispersion stability in water.

As showed in Table 2, while precipitation occurred in water for Cloisite 10A and Cloisite 30B, the organo-modified clay of the present invention formed a stable dispersed phase.

TABLE 2

| Specimen Descriptions | | Clay types | Dispersion medium | Measuring period | dispersion stability |
|---|---|---|---|---|---|
| Example | 3 | Na + montmorillonite-Glycidol | Deionized water | 7 days | Good dispersability |
| | 6 | Na + montmorillonite-BHMP | Deionized water | 7 days | Good dispersability |
| Comparative Example | 2 | Cloisite 10A | Deionized water | 7 days | precipitation |
| | 3 | Cloisite 30B | Deionized water | 7 days | precipitation |

According to the present invention, it will be easily understood by those skilled in the art that simple modifications and changes can be made thereto. Also, such modifications and changes are encompassed within the scope of the present invention.

What is claimed is:

1. A method of preparing a hyperbranched organic modifier comprising:

reacting (a) a tertiary amine compound having at least two terminal hydroxyl groups with (b) at least one multifunctional monomer having at least two terminal functional groups capable of reacting with said hydroxyl groups to prepare a hyperbranched organic modifier having a number average molecular weight of about 200 to about 30,000, about 5 to about 300 hydroxyl groups per polymer chain and about 0 to about 100 carbonyl groups per polymer chain.

2. The method of claim 1, wherein said tertiary amine compound (a) is represented by the following Chemical Formula 1:

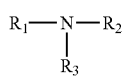  [Chemical Formula 1]

wherein $R_1$ is a $C_1\sim C_8$ aliphatic group having a terminal hydroxyl group or a terminal amine group; $R_2$ and $R_3$ are independently a $C_1\sim C_{18}$ aliphatic group having a terminal hydroxyl group; and the functionality of said tertiary amine is 2~3.

3. The method of claim 1, wherein said multifunctional monomer (b) is represented by the following Chemical Formula 2:

$$A_x\text{-R-}B_y$$  [Chemical Formula 2]

wherein R is a $C_{1-20}$ aliphatic or aromatic group or a derivative thereof; A and B are selected from the group consisting of hydroxyl group, amine group, epoxy group, and carboxyl group; x is 1 or 2; y is an integer from 1 to 4; and the functionality of said multifunctional monomer is 2~6.

4. A hyperbranched organic modifier prepared by the method as defined in claim 1 including reacting (a) a tertiary amine compound having at least two terminal hydroxyl groups with (b) at least one multifunctional monomer having at least two terminal functional groups capable of reacting with said hydroxyl groups, wherein said hyperbranched organic modifier has a number average molecular weight of about 200 to about 30,000, about 5 to about 300 hydroxyl groups per polymer chain and about 0 to about 100 carbonyl groups per polymer chain.

5. An organo-modified clay treated with the hyperbranched organic modifier as defined in claim 4, wherein said organo-modified clay has an interlayer distance of from about 3 nm to about 20 nm.

6. The organo-modified clay of claim 5, wherein said organo-modified clay is treated by adding the hyperbranched organic modifier to water-dispersed layered silicates to perform an ion exchange reaction.

7. The organo-modified clay of claim 6, wherein said layered silicates are at least one selected from the group consisting of montmorillonite, hectorite, saponite, laponite, beidellite, bentonite, nontronite, vermiculite, illite, muscovite, pyrophilite and mica.

8. A nanocomposite resin comprising:
about 100 parts by weight of one or more base resin selected from the group consisting of high impact polystyrene (HIPS) resin, polyolefin resin, polyamide resin, acrylic resin, polyester resin and rubber-modified aromatic vinyl-cyanide vinyl graft copolymer resin; and
about 0.1 to about 20 parts by weight of the organo-modified clay as defined in claim 5.

* * * * *

UNITED STATES PATENT AND TRADEMARK OFFICE
CERTIFICATE OF CORRECTION

PATENT NO. : 8,394,878 B2
APPLICATION NO. : 12/665077
DATED : March 12, 2013
INVENTOR(S) : Il Jin Kim et al.

It is certified that error appears in the above-identified patent and that said Letters Patent is hereby corrected as shown below:

In the Specification

Column 1, Line 1, the following paragraph was omitted:

Cross-Reference to Related Applications
This application is a national stage application under 35 USC Section 371 and claims priority to and the benefit of International Application No. PCT/KR2007/007006, filed December 31, 2007, designating the U.S. and published as WO 2009/005190, and further claims priority to and the benefit of Korean Patent Application No. 10-2007-0066039 filed in the Korean Intellectual Property Office on July 2, 2007, wherein the entire disclosure of each of the foregoing is incorporated herein by reference.

Column 1, Line 6, reads: "TECHNICAL FIELD" and should read: "Field of the Invention"

Column 1, Line 16, reads: "BACKGROUND ART" and should read: "Background of the Invention"

Column 2, Lines 1-3, reads: "DISCLOSURE OF THE INVENTION" followed by "Technical Problem": and should read: "Summary of the Invention"

Column 2, Line 21, should omit: "Technical Solution"

Column 2, Lines 58-59, reads: "BEST MODE FOR CARRYING OUT THE INVENTION" and should read: "Detailed Description of the Invention"

Column 6, Line 18, should omit: "Mode of the Invention"

Column 8, Line 32, reads: "was pulverized to the size of 200 μM or less and then stored." and should read: "was pulverized to the size of 200 μm or less and then stored."

Signed and Sealed this
Third Day of September, 2013

Teresa Stanek Rea
*Acting Director of the United States Patent and Trademark Office*